United States Patent [19]

Jacobi et al.

[11] 4,186,880
[45] Feb. 5, 1980

[54] PROGRAM CONTROL FOR CENTER POST IRRIGATION SYSTEM

[75] Inventors: Edgar F. Jacobi, Huntington Beach, Calif.; Mark R. Madden, Plainsfield, Wis.

[73] Assignee: Colkhi, Inc., San Diego, Calif.

[21] Appl. No.: 950,991

[22] Filed: Oct. 13, 1978

[51] Int. Cl.² ............................................. B05B 3/12
[52] U.S. Cl. ................................. 239/177; 137/344; 239/DIG. 1
[58] Field of Search ......... 239/177, 212, 394, DIG. 1; 137/344

[56] References Cited

U.S. PATENT DOCUMENTS

| | | | |
|---|---|---|---|
| 3,802,627 | 4/1974 | Seckler et al. | 137/344 X |
| 3,979,062 | 9/1976 | Christensen et al. | 239/177 X |
| 3,982,698 | 9/1976 | Anderson | 239/394 |
| 4,033,508 | 7/1977 | Jacobi et al. | 239/177 |

Primary Examiner—Robert B. Reeves
Assistant Examiner—Andres Kashnikow
Attorney, Agent, or Firm—William C. Babcock; I. Michael Bak-Boychuk

[57] ABSTRACT

The present disclosure entails a program controlled multi-loop system for providing even distribution of irrigating water over normally square plots. More specifically the disclosure includes control loops connected to a center post irrigation system which control the advance rate, the flow rate, select an end gun nozzle, and select the elevation of the end gun under program control to provide even coverage. In this manner a telescopically extended system of the type described in our prior U.S. Pat. No. 4,033,508 is improved to both insure even irrigation and full coverage of corners.

4 Claims, 8 Drawing Figures

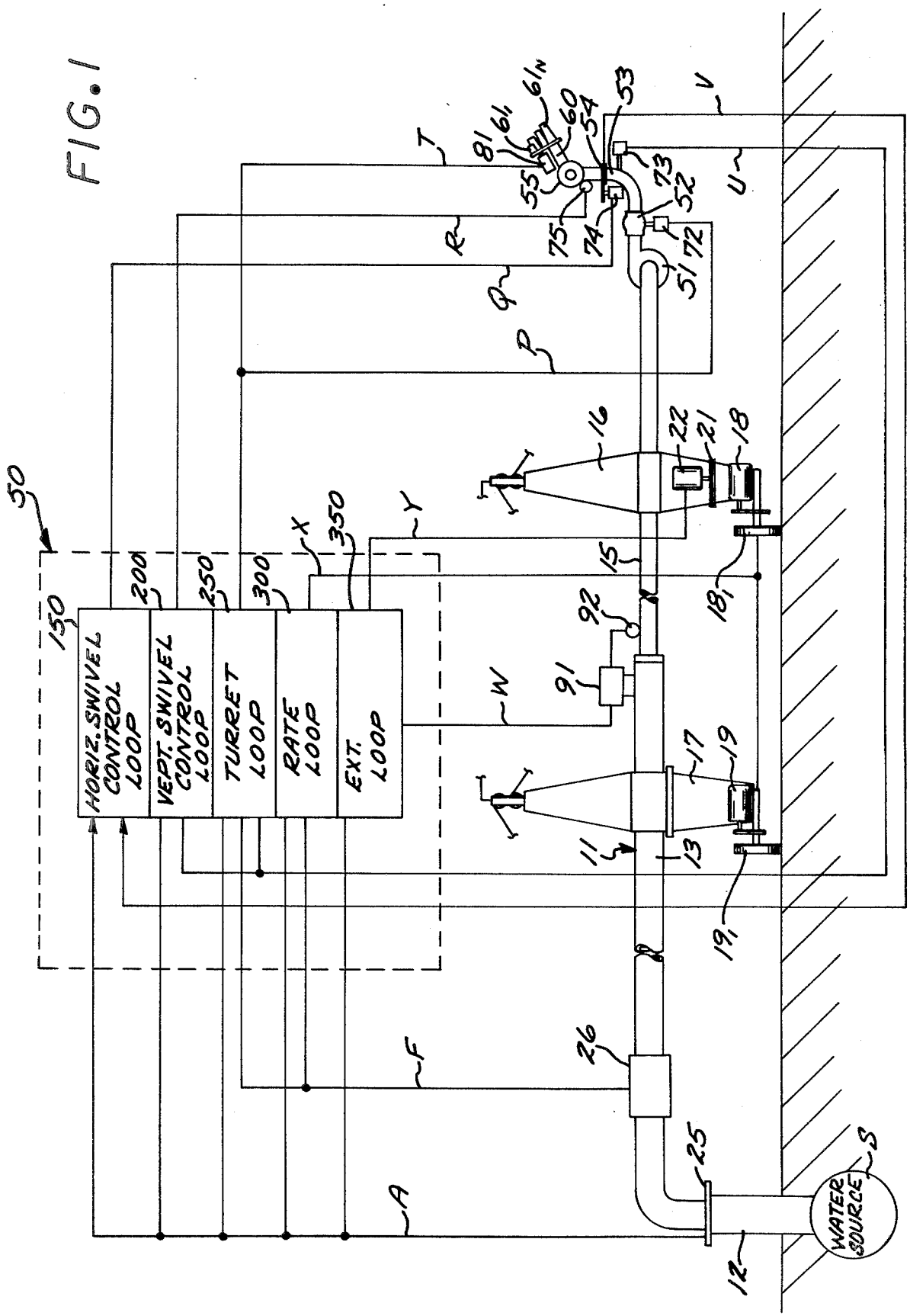

PROGRAM CONTROL FOR CENTER POST IRRIGATION SYSTEM

BACKGROUND OF THE INVENTION

1. Field of the Invention

The present invention relates to automatic control systems, and more particularly to programmable systems useful with center post irrigation devices.

2. Description of the Prior Art

As we have set out in our prior U.S. Pat. No. 4,033,508 the most prevalent technique for irrigating large forming tracts is by way of a center post irrigation system. Systems of this kind are typically adapted to provide a circular pattern and therefore the corners have been heretofore not properly covered. In the foregoing patent we have set out a technique for irrigating corners by extending the end of the pivoted beam at selected increments of arc. The present invention sets out further improvement to an irrigation system of this latter kind, these improvements providing control over the flow rate, corner distribution, and rate of advance.

SUMMARY OF THE INVENTION

Accordingly it is the general purpose and object of the present invention to provide automatic controls to a telescoping center post irrigation system wherein the rate of pivotal advance, the flow rate and the water trajectory at the end are controlled according to arc-related logical sequences.

Other objects of the invention are to provide improvements in a center post irrigation system for assuring even flow distribution and full coverage of typical square plots.

Yet further objects of the invention are to provide a closed loop control system useful with telescopic center post irrigation arrangements.

Yet additional objects of the invention are to provide a control system for achieving maximum utilization of irrigating water within a rectangular plot.

Briefly these and other objects are accomplished within the present invention by providing a control system connected to a circular irrigator, the control being referenced to an arc position indicator, or a shaft encoder, and located at the pivot of the irrigation pipe. The control system includes a friction wheel pickoff on a telescopic pipe extension, the pickoff being tied to an up-down counter for indicating, in binary code, the extension of the pipe. The pipe extension count is compared with two count imputs selected by the shaft encoder and the error is used to control a carriage steering servo which extends or retracts the telescoping end. Mounted on the end of the extendable pipe is an electrically driven pump having the output thereof applied, through a pressure control valve, to a swiveling mount which supports an end gun turret. The swiveling mount is articulated along two axes of rotation, the first axis controlling the angular position of the turret while the second axis controls the angle of elevation. The turret itself comprises a plurality of nozzles of various opening size which are selected in incremental angular selection for end opening size. By controlling the pressure levels through the pressure control valves, and the opening size together with the horizontal swivel and the vertical swivel according to program functions tied to the shaft encoder at the irrigation pivot full coverage of a square plot can be achieved. Similarly the extension of the pipe and the rate of advance are tied to the same shaft encoder through yet another shaping program to insure even distribution. The selection of angular rate is further modified by a flow meter output to fully compensate for varying flow conditions of the source.

The foregoing control system is implemented for use with a telescopically deployed center post irrigation system of the type described in our prior U.S. Pat. No. 4,033,508. By virtue of this control system even and efficient utilization of water is assured, and more particularly full coverage of irregular farming plots is provided.

BRIEF DESCRIPTION OF THE DRAWINGS

FIG. 1 is a schematic diagram of a control system constructed according to the invention set out herein;

DESCRIPTION OF THE SPECIFIC EMBODIMENT

Figure 3:
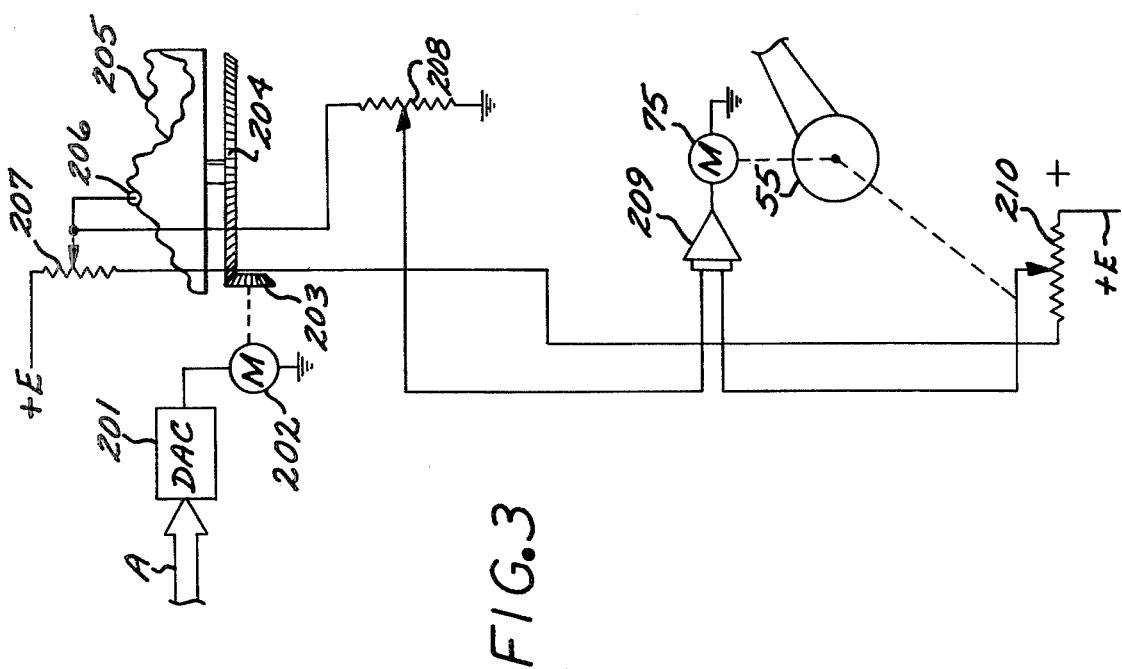
FIG. 3 is yet another diagrammatic illustration of a control servo useful in regulating the elevation angle of an end nozzle provided in the invention herein.

As shown in FIG. 1 the inventive control system, generally designated by the numeral 50 is mounted onto a telescoping center post irrigation system shown generally at 11 and described in our prior U.S. Pat. No. 4,033,508. While periodic reference shall be made to various components of the previously set out center post irrigation system, it is to be understood that the full description thereof is implemented in the foregoing patent. Reference, therefore, should be had to the disclosure of the aforementioned patent which in conjunction with the following description fully sets out the preferred operative mode of the present invention.

The previously described center post irrigation system 11 comprises a center pivot 12 connected to a water source S and extending to support, in pivotal engagement, a horizontally aligned irrigation pipe 13. Extending from the free end of the irrigation pipe 13 is a pipe extension 15 telescopically articulated in and out of the end of pipe 13 by way of an end carriage 16. Carriage 16, together with yet another carriage 17 supporting pipe 13, provide the requisite motive force for translating the center post system 11 around the pivot 12. To achieve this each carriage 16 and 17 is provided with a corresponding drive motor 18 and 19 each geared to drive wheeled carriages $18_1$ and $19_1$. In addition carriage 16 includes a steering pivot 21 geared to a steering motor 22 controlling the angular alignment of carriage $18_1$ relative local tangent.

By virtue of the foregoing arrangement of parts motors 18 and 19 translate the pipe 13 and the extension 15 around the pivot, motor 22 further providing the necessary steering inputs to extract or bring in the deployment of the extension. The various steering commands to motor 22 originate at an arc position transducer 25 conformed as a binary coded shaft encoder and connected according to the means following. In addition to shaft encoder 25 there is included in pipe 13 a flow meter 26 for providing a signal F indicative of a flow rate of irrigating water. Signal F is combined with a signal A generated at the arc position transducer 25 in a control system 50 to be described.

The end of extension 15 terminates in an electrically driven pump 51, the high pressure output of pump 51 being fed across a regulated valve 52 to a vertically directed elbow 53 which at the end thereof supports a horizontal swivel 54 articulating a vertical swivel 55 tied to an outlet pipe 60. Outlet pipe 60, in turn, evacuates through a selected nozzle $61_1$ through $61_n$ in a turret assembly 61 mounted for selective alignment therewith.

It should be understood that each of the foregoing articulation devices includes a corresponding servo motor geared therewith and feedback signals where necessary, control valve 52 including a pressure regulating mechanism 72, the horizontal swivel 54 including a geared servo motor 74, the vertical swivel 55 including yet another geared motor 75 and the turret 61 being driven in rotation by a stepping turret motor 81. Pressure regulating mechanism 72 receives a control signal P from the control system 50, motor 74 receiving an output signal Q therefrom, motor 75 receiving a signal R and motor 81 receiving a signal T. Concurrently the pressure within elbow 53 is monitored by a pressure transducer 73 which feeds back a pressure signal U and the swivel position of the horizontal swivel 54 is picked off by a feedback signal V. Signals U and V are returned to the control system 50 to be combined therein with signals A and F and the above signals according to the description following. In addition the extension 15 is monitored by a linear indexing signal generator W including an up-down counter 91 articulated by a friction wheel 92 in a conventional manner.

As a further function control system 50 provides the necessary speed control signals to motors 18 and 19 shown herein as a common signal X and steering signal to motor 22 shown herein as steering signal Y for articulating swivel 21.

The inventive control system 50 comprises a horizontal swivel control loop 150 issuing the foregoing signal Q according to the combination of signal V and A. Further included is a control loop 200 issuing the foregoing signal R to the vertical swivel according to the combination of signals A and U. The turret selection is in turn controlled by a turret loop 250 issuing the foregoing signal P to the pressure control valve 72 and a signal T to the turret motor 81. The inputs to the turret loop 250 are the angular position signal A, the flow rate signal F and the pressure signal U. In addition there is included a rate loop 300 issuing the signal X in response to the combination of signals A and F and an extension loop 350 issuing signal Y in response to signal A and W.

Figure 2:
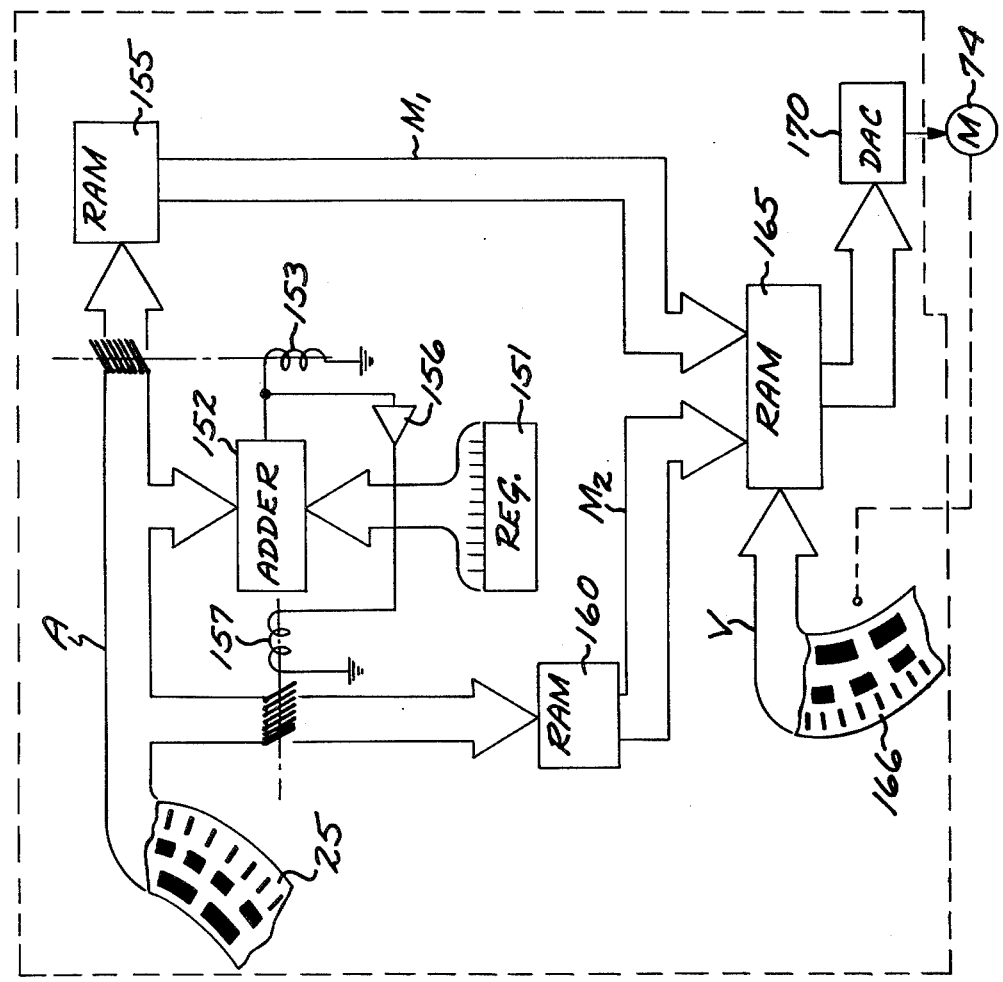
FIG. 2 is a schematic diagram of the end nozzle swivel rate control servo useful with the invention herein.

As shown in FIG. 2 the configuration of the horizontal swivel control loop 150 receives the signal A, as generated by the shaft encoder 25, in parallel binary code indicating the angular position of pipe 13 relative the pivot 12. This signal A is compared, in subtraction, with an eight bit binary code signal stored in a register 151 corresponding to the code for a 45° angle. The comparison itself may be provided by any conventional adder having sufficient capacity, the adder being shown herein by a symbolic summing node 152. The sign bit of adder 152, if high, closes a relay 153 including a plurality of parallel switches, the switches of relay 153 completing the circuit carrying signal A to the address terminals of a static RAM 155. The same sign bit of adder 152, inverted through an inverter 156, operates yet another relay 157 in a second branch of signal A addressing a static RAM 160.

RAM 155 provides a lookup function $M_1$ in response to the bit code on signal A. Alternatively RAM 160 provides a lookup code $M_2$. Codes $M_1$ or $M_2$ are alternatively applied to yet another RAM 165 which also receives the foregoing feedback signal V developed at a shaft encoder 166 tied for angular rotation along with the swivel 54. The output of RAM 165 is applied to a digital-to-analog converter 170 which provides the necessary control signal to motor 74 articulating the swivel.

In this manner two lookups are provided depending the polarity or pivot angle of pipe 13. These lookups together with the feedback signal V provide the necessary inputs for controlling the horizontal swivel rate.

The vertical swivel control loop 200 is similarly implemented, receiving the parallel signal A at the input of a digital-to-analog converter 201, according to the illustration of FIG. 3. The linear or analog output of converter 201 is then applied to a servo motor 202 driving a pinion gear 203 engaged to a ring gear 204 which rotates a circular cam 205. Cam 205 is essentially circular in planform having a vertical cam surface convolved to provide four peaks and four low points serrated by stepping increments therebetween to correspond to the various turret selections to be described. Cam 205 engages a cam follower 206 tied to the wiper of a potentiometer 207 which is referenced to yet another adjustable potentiometer 208 at one end thereof. The signal difference between the wiper of potentiometer 207 and the referenced side is applied as one input into an integrator 209 which at the other input receives the output of a feedback potentiometer 210 tied to the vertical swivel 55. The output of integrator 209 is then applied to the above-mentioned swivel motor 75 geared to articulate the swivel.

Figure 4:
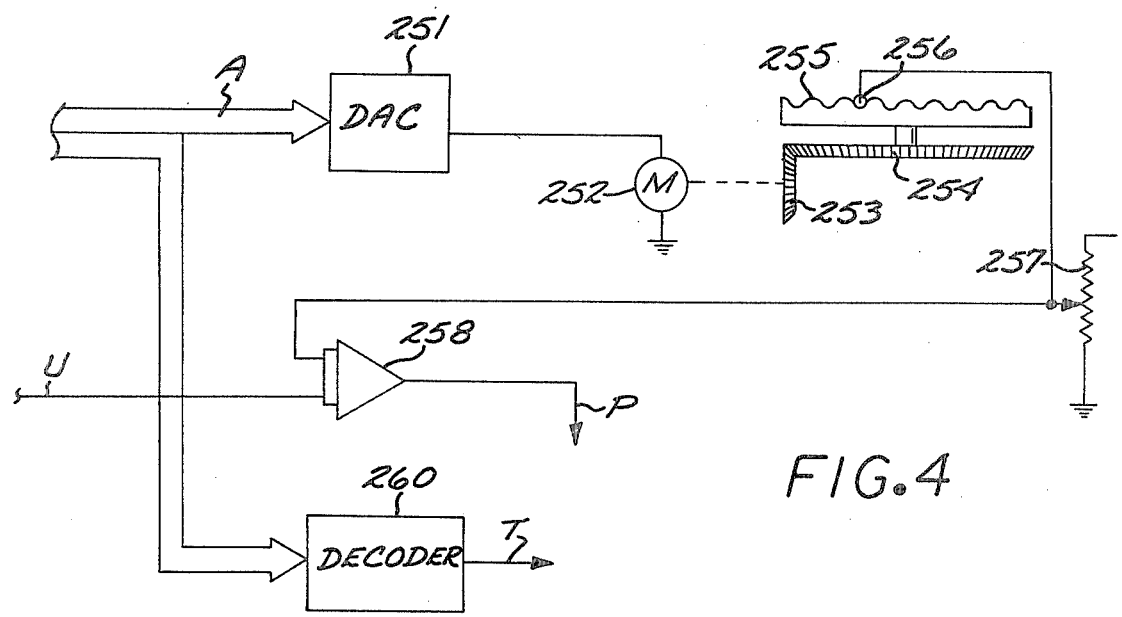
FIG. 4 is a pressure control servo diagram useful with the invention herein.

In similar manner the selection of the turret and the control over the pressure regulating valve 52 is achieved by the turret loop 250, in the configuration as shown in FIG. 4. In this control loop signal A, once more, is received at the input of a digital-to-analog converter 251 driving a servo motor 252 which in turn turns a pinion gear 253 geared to a ring gear 254 rotating a circular cam 255. A cam follower 256 moves the wiper of a potentiometer 257 tied as one input to an integrator 258 which at the other end receives the output of the pressure transducer 73 shown as signal U. Integrator 258 provides the aforementioned signal P to the control mechanism 72 on the pressure regulating valve 52. At the same time selected bit positions of signal A are applied to a decoder 260 which in a conventional manner applies the stepping inputs to the turret motor 81 advancing the turret 61, this signal being heretofore identified as signal T.

Figure 5:
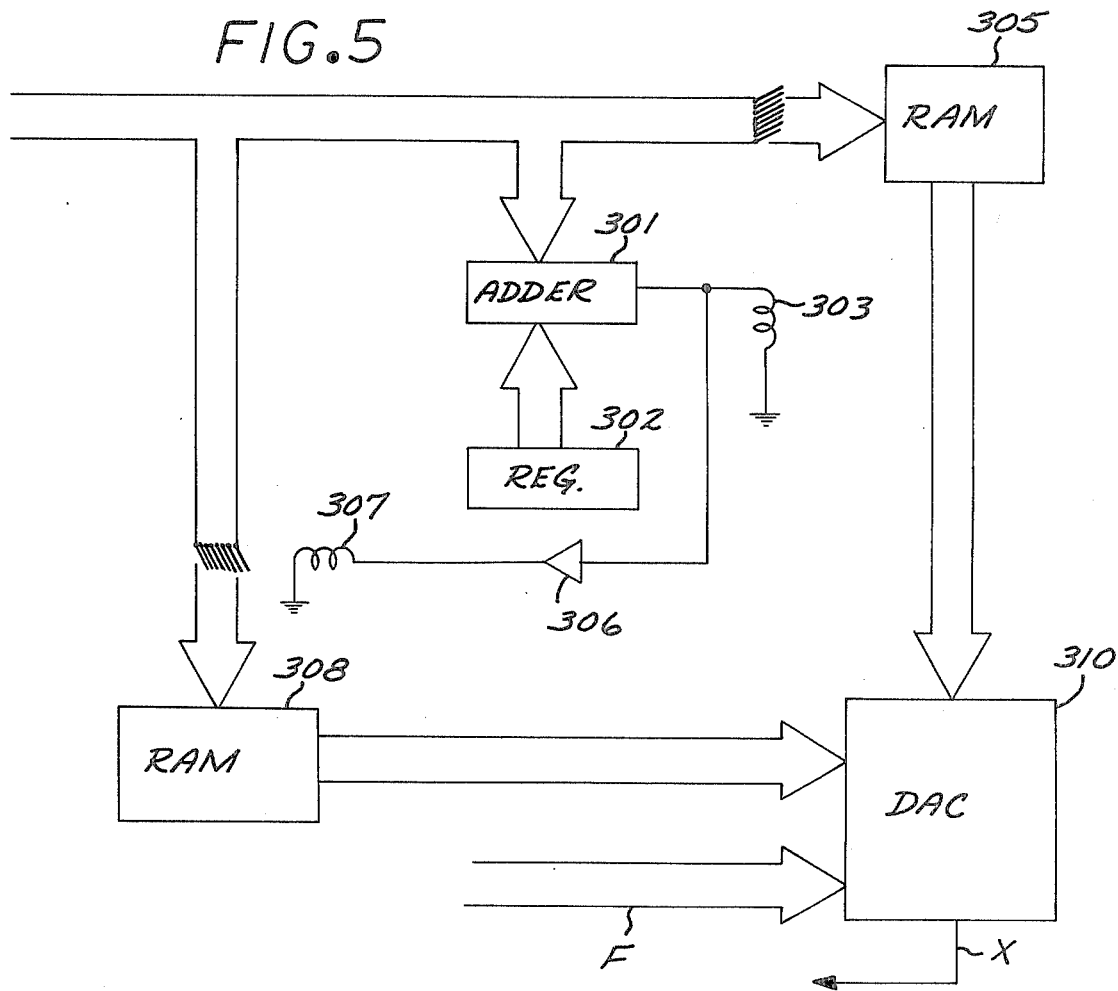
FIG. 5 is a diagrammatic illustration of the angular rate control servo useful with the invention disclosed herein.

In a similar manner the rate loop 300, as illustrated in FIG. 5 receives the parallel bit signal A at the input of an adder 301 which at the other input receives the output of a register 302. The sign bit of adder 301, once more, energizes a relay 303 completing the path of signal A to a RAM 305. This same sign bit output, inverted through an inverter 306, operates yet another relay 307 completing the transmission of signal A along another path to a RAM 308. The alternative outputs of RAMS 305 or 308 are applied to a digital-to-analog converter 310 which applies the aforementioned speed control signal X motors 18 and 19 respectively. This digital-to-analog converter 310 also receives the aforementioned signal F raising or lowering the rate according to the water flow rates within the flow meter 26.

Figure 6:
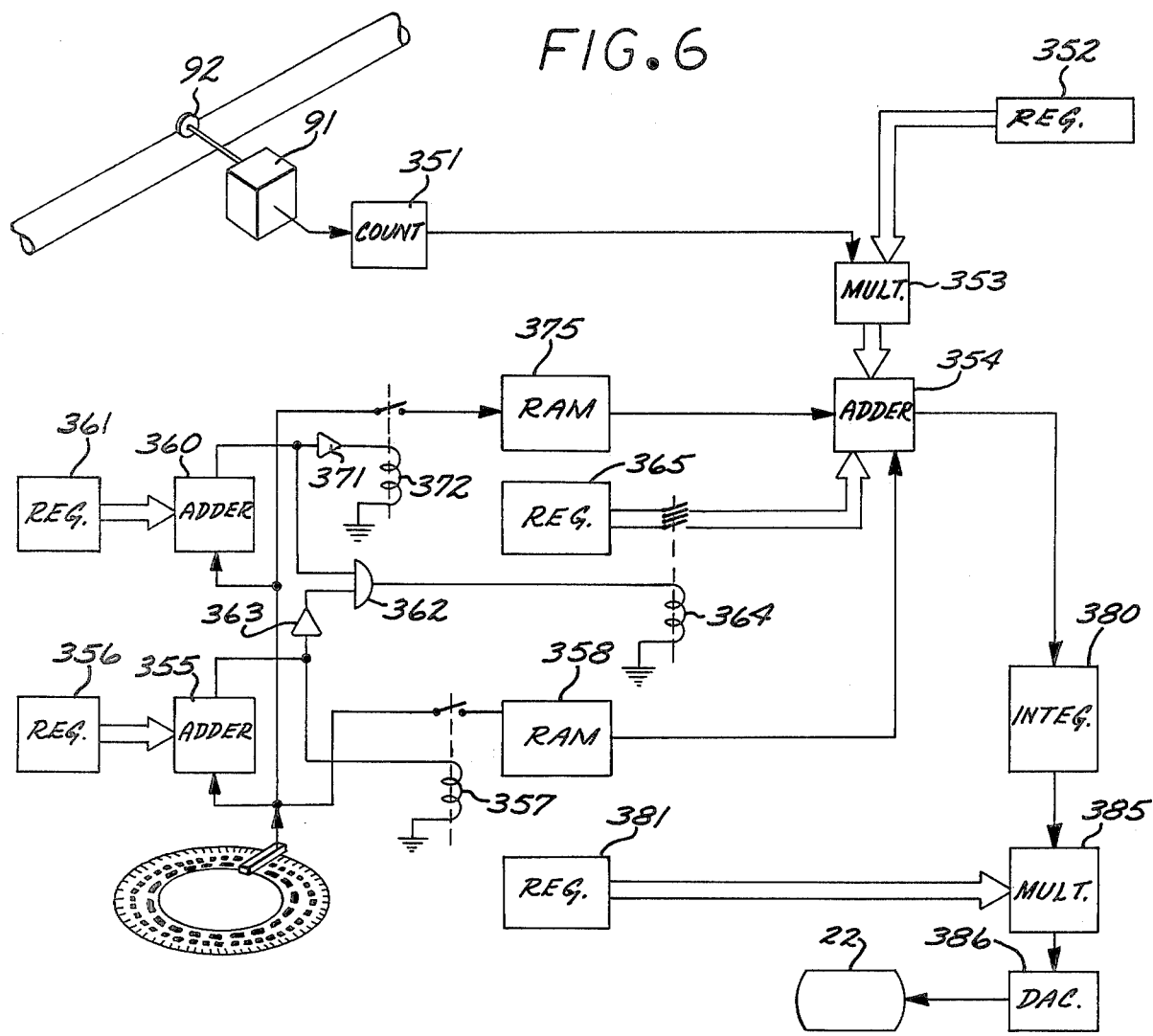
FIG. 6 is yet another diagrammatic illustration illustrating in detail a carriage path control servo useful in the system shown in FIG. 1.

The configuration of extension loop 350 as similarly implemented according to the schematic shown in FIG. 6. More specifically the friction wheel 92 engaged the exterior of the telescopic extension 15 providing a rotary input to the bidirectional shaft encoder 91. The output of shaft encoder 91 is applied to an updown counter 351 as the signal W, the output of counter 351 being multiplied with the contents of an eight bit register 352 at a multiplier 353. This scaled distance output of multiplier 353 is applied as a negative input to a summing node shown generally as an adder 354. Adder 354 also receives one of three alternative data inputs according to the sequence following. More specifically the angular position, i.e., signal A, is applied to yet another adder 355 which concurrently receives the output of a register 356 in subtraction. The sign bit of the adder 355 than excites a relay 357 completing the path of signal A to a RAM 358. This same signal A is also branched off as an alternative path to yet another adder 360 where it is subtracted by the contents of a register 361. The sign bit of adder 360 is combined in a logical AND gate 362 with the inverted sign bit from adder 355, this sign bit being inverted by an inverted 363. The output of gate 362 switches yet another relay 364 closing the signal path from an 8 bit register 365 to the summing node formed by an adder 354. The sign bit of adder 360, furthermore, is inverted by an inverter 371 which controls yet another relay 372 in the path between signal A and a RAM 375. The output of RAM 375 is again applied, as an alternative input, to the summing node provided by the adder 354. The output of adder 354 is fed to an integrator circuit 380 and the integrated output therefrom is combined with the contents of the register 381 as the two inputs to a multiplier 385. Multiplier 385 is then fed to a digital-to-analog converter 386 which provides the signal to the aforementioned steering motor 22.

Figure 7:
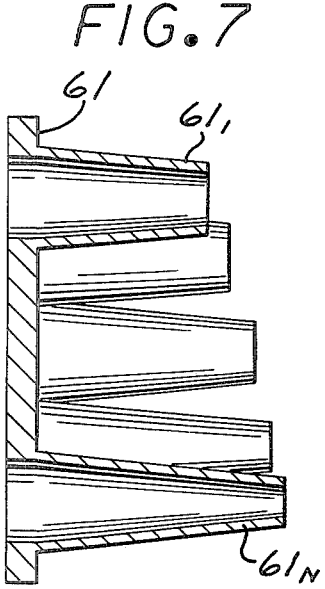
FIG. 7 is a sectional side view of a multinozzle end gun turret useful with the invention herein.
Figure 8:
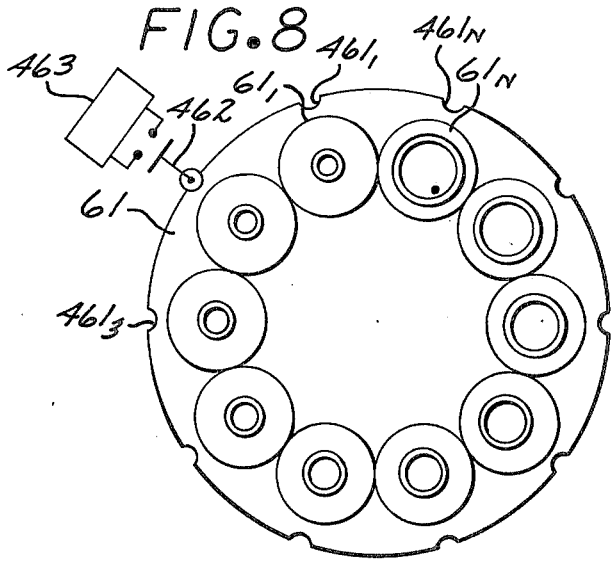
FIG. 8 is a plan view of the nozzle shown in FIG. 7.

By way of the foregoing combination of parts a substantially even distribution of water can be achieved in any irregular or geometric irrigated plot. Thus, by flow control, essentially all of the square plot is irrigated at a consistent level of irrigation. More specifically, and by way of example in a square plot, the end gun turret 61 shown in FIG. 1 is maintained next to the carriage 16 for approximately the first $32\frac{1}{2}°$ of rotation during which the same carriage already begins to extend the pipe extension from the end of the pipe 13. (See disclosure in U.S. Pat. No. 4,033,508) In the first 10 degrees of rotation the end gun turret begins applying water to the area outside of the circle traversed the first application beginning in a small circular pattern controlled by the turret nozzle selected, the pressure level in elbow 53 and the pivot angle of the vertical swivel 55. At $32\frac{1}{2}$ degrees the various lanyards and pulleys provided in our prior U.S. Pat. No. 4,033,508 initiate the translation of the end gun assembly beyond the diameter of carriage 16 until a maximum is reached at 45 degrees rotation. Since the flow rate of source S is essentially constant the rate of rotation of the system must consequently decrease as the pipe length is increased. At 45 degrees this extension process reverses with the concurrent reversal in the angular rate. This translation function is provided for in the servo system 300 set out in detail in FIG. 5. More specifically register 302 contains in binary code, the equivalent function for 45 degrees of rotation. Prior to the time that this equivalent is reached RAM 305 provides the flow rate function, i.e., an advance rate approximated by a third order approximation as $7.485 - 0.02142A - 0.0001348A^2 - 0.0000071A^3$ degrees/hour. This function is set in as a straight digital look up in the RAM. The digital signal is fed to digital-to-analog converter 310 which provides the necessary signal inputs to motors 18 and 19 to either advance or retard the angular rotation of the center pivot. On the other end of 45 degrees RAM 308 applies a look up function, thus providing a fully controlled profile within each corner. Concurrently the vertical inclination of the turret is controlled according to the cam profile 205 tied, once more, to the angle position of the irrigation system. The cam profile 205 includes in it the steps for accommodating the various turret selections, according to signal T as produced by the decoder 260. These turret selections are as shown in FIGS. 7 and 8 illustrating the different nozzle sizes in turret 61. More specifically, in order to provide the full range of variability of the end sprinkler throw both the nozzle area and pressure have to be varied. Since the nozzle flow rate is related to the area according to the relationship $Q=KAV$ where variable $Q=$nozzle flow rate, $A=$area of nozzle discharge open, $V=$velocity of the water stream at the nozzle opening and $K=$constant of proportionality, the velocity, is related to the upstream pressure as $V=\sqrt{2GH}$ where G is a gravity constant and H is a pressure head upstream of the nozzle. Thus the nozzle flow rate is related to the square root of the upstream pressure and directly to the area of the nozzle opening. Based on these two relationships the cam surface can be stepped for each turret nozzle. This cam surface provides the input to the pressure regulator which when combined with the vertical swivel cam surface 205 controls both the angle of the elevation and the trajectory to achieve the proper water distribution.

The remaining functions are similarly implemented either as look ups in the various RAMS or as cam shapes. In each instance the end turret selection is combined with the pressure level to determine the throw and the horizontal swivel rate determines the distribution. Concurrently the extension is translated in and out to approximate the square while the rate of advance is adjusted to compensate for the flow change associated with extension.

In the foregoing illustration example has been made by way of a square farming plot. It should be understood that other shapes can be accommodated in the cam and the functions stored. In these instances other angular functions will take effect and angles other than 45 degrees will set the extension maxima. The range of shapes thus accommodated is wide, there being a trade off between nozzle selection and pressure increment as an example.

As shown in FIGS. 7 and 8 the end turret 61 comprises a circular base plate 461 provided with peripheral notches $461_1$-$461_n$ into which a follower 462 in the latching circuit of a latching relay 463 drops. Relay 463 is set or latched by the above-mentioned control signals and when the next nozzle $61_1$-$61_n$ is selected unlatching occurs.

Obviously many modifications and variations to the above disclosure can be made without departing from the spirit of the invention. It is therefore intended that the scope of the invention be determined solely on the claims appended hereto.

What is claimed is:

1. In a center post irrigation system including a telescoping extension supported on a steerable carriage for pivotal translation, the improvement comprising:
   angular measuring means attached to said irrigation system for providing an angular signal indicative of the pivotal advance thereof;
   angular rate control means connected to said irrigation system and adapted to receive said angular signal for controlling the angular rate of said system in response thereto;
   a rotatable turret mounted on the end of said telescopic extension including a plurality of radially disposed nozzles each selectively aligned with said end; and
   pressure control means mounted in said extension for regulating the pressure of liquids propagated therethrough in response to said angular signal.

2. Apparatus according to claim 1 further comprising:
   a horizontal and vertical swivel interposed between said extension and said turret for providing the vertical and horizontal alignment thereof; and
   swivel control means connected to said swivels and adapted to receive said angular signal for controlling the rotation thereof.

3. Apparatus according to claim 2 wherein:
   said turret includes stepping means operatively connected to said angular signal for advancing the alignment thereof in response to said angular signal.

4. Apparatus according to claim 3 wherein:
   said swivel control means includes addressable memory means adapted to store predetermined combinations of swivel control signals addressable by said angular signal, said swivel control signals being connected to control said vertical and horizontal swivels.

* * * * *